United States Patent
Agarwalla et al.

(10) Patent No.: US 6,985,936 B2
(45) Date of Patent: Jan. 10, 2006

(54) ADDRESSING THE NAME SPACE MISMATCH BETWEEN CONTENT SERVERS AND CONTENT CACHING SYSTEMS

(75) Inventors: Rajesh S. Agarwalla, Pittsburgh, PA (US); Ronald P. Doyle, Raleigh, NC (US); Tianyu Jiang, Pittsburgh, PA (US); Thirumale Niranjan, Pittsburgh, PA (US); Srikanth Ramamurthy, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 09/966,229

(22) Filed: Sep. 27, 2001

(65) Prior Publication Data

US 2003/0061278 A1    Mar. 27, 2003

(51) Int. Cl.
G06F 15/177      (2006.01)
G06F 12/00       (2006.01)
G06F 7/00        (2006.01)

(52) U.S. Cl. .................... 709/221; 709/213; 709/222; 709/223; 707/10; 711/141

(58) Field of Classification Search .......... 709/203, 709/213, 219, 221, 223, 222; 707/10, 100; 711/141
See application file for complete search history.

(56) References Cited

U.S. PATENT DOCUMENTS

| | | | | |
|---|---|---|---|---|
| 5,465,365 A | * | 11/1995 | Winterbottom | 707/101 |
| 5,864,852 A | * | 1/1999 | Luotonen | 713/201 |
| 6,023,506 A | * | 2/2000 | Ote et al. | 713/165 |
| 6,195,707 B1 | * | 2/2001 | Minh | 709/245 |
| 6,256,031 B1 | * | 7/2001 | Meijer et al. | 715/854 |
| 6,308,188 B1 | * | 10/2001 | Bernardo et al. | 715/530 |
| 6,330,561 B1 | * | 12/2001 | Cohen et al. | 707/10 |
| 6,385,642 B1 | * | 5/2002 | Chlan et al. | 709/203 |

(Continued)

OTHER PUBLICATIONS

Microsoft Corporation. "Persistent URL Cache Functions", Microsoft Win32 Internet Programmer's Reference, 1996, <http://web.archive.org/web/19970605045634/http://graph-comp.com/info/specs/ms/inetr007.htm>, 11 pages.*

Apache Foundation. "Mapping URLs to Filesystem Locations", Apache HTTP Server Version 1.3, released Jun. 8, 1998, <http://httpd.apache.org/docs/urlmapping.html>, 4 pages.*

(Continued)

*Primary Examiner*—David Wiley
*Assistant Examiner*—George C. Neurauter, Jr.
(74) *Attorney, Agent, or Firm*—Marcia L. Doubet

(57) ABSTRACT

Techniques are disclosed for addressing the name space mismatch between content caching systems (which use Uniform Resource Locators, or "URLs") and content servers (which use file and path names). A file name-to-URL mapping is created for use by content caching systems, and data in protocol response messages (and optionally in protocol request messages) is augmented to transmit information for use in creating this mapping, enabling a content caching system to automatically and dynamically populate its file name-to-URL mapping. By having the file name available, the caching system can now respond to content management messages which identify the cached content by only the content's associated file name. Techniques for encoding the message extensions include: use of new directives on existing cache-control headers in Hypertext Transfer Protocol ("HTTP") messages; addition of new headers in HTTP messages; and use of meta-data in markup languages such as Hypertext Markup Language ("HTML") or Extensible Markup Language ("XML") format.

45 Claims, 15 Drawing Sheets

U.S. PATENT DOCUMENTS

| | | | |
|---|---|---|---|
| 6,408,298 B1 * | 6/2002 | Van et al. | 707/10 |
| 6,578,113 B2 * | 6/2003 | Krishnamurthy et al. | 711/141 |
| 6,839,700 B2 * | 1/2005 | Doyle et al. | 707/2 |
| 2002/0194382 A1 * | 12/2002 | Kausik et al. | 709/246 |
| 2003/0041093 A1 * | 2/2003 | Yamane et al. | 709/201 |
| 2003/0041094 A1 * | 2/2003 | Lara et al. | 709/201 |

OTHER PUBLICATIONS

Apache Foundation. "Apache module mod_proxy", Apache HTTP Server Version 1.3, released Jun. 8, 1998, <http://httpd.apache.org/docs/mod/mod_proxy.html>, 13 pages.*

Goland, Y. et al. "Request for Comments (RFC) 2518: HTTP Extensions for Distributed Authoring — WEBDAV", published by Network Working Group, <http://www.faqs.org/rfcs/rfc2518.html>.*

Krishnamurthy, B. et al. "Piggyback server invalidation for proxy cache coherency", Computer Networks and ISDN Systems, vol. 30; No. 1-7, 12 pages.*

Duvvuri, Venkata. "Adaptive Leases: A Strong Consistency Mechanism for the World Wide Web", 1999, 30 pages.*

"InfoLibria: Products & Services, Overview", http://www.infolibria.com/products/indes.html, 1 page.

"InfoLibria: Products & Services, Content Commander", http://infolibria.com/products/indes.html, 2 pages.

"InfoLibria: Products & Services, Dynacache", http://www.infolibria.com/products/indes.html, 1 page.

* cited by examiner

FIG. 4
(Prior Art)

| | URL *402* | File Name *404* |
|---|---|---|
| *410* | http://www.ibm.com | d:\main_files\home_page.htm *411* |
| *420* | http://www.ibm.com/legal/copytrade.html | d:\legal_files\copyright\main.html *421* |
| *430* | http://www.ibm.com/legal/copyright.html | d:\legal_files\copyright\main.html *431* |
| *440* | http://www.ibm.com/legal/trademark.html | d:\legal_files\copyright\main.html *441* |
| *450* | ftp://abc.def.com/xyz | c:\myWebFiles\aaa.jpg *451* |

| | FileName 602 | URL 604 |
|---|---|---|
| 610 | c:\myWebFiles\aaa.txt | ftp://abc.def.com/xyz 611 |
| 620 | c:\myWebFiles\aaa.txt | http://abc.def.com/xyz 621 |
| 630 | c:\myWebFiles\aaa.txt | http://abc.def.net/xyz 631 |
| 640 | c:\filesForImages\xyz.gif | http://xyz.def.com/xyz 641 |

710 GET http://www.ibm.com/abc.html HTTP/1.1
    Host: www.ibm.com

712 Content-Type: text/html
714 CDist_Aware: Yes
    ... message content follows ...

FIG. 7B

720 <META HTTP-EQUIV="CDist_Aware" CONTENT="1" />

FIG. 7C

730 <META NAME="CDist_Aware" VALUE="1" />

FIG. 7D

```
<BODY>
  :
  <! CDist_Aware: Yes -- this cache is able to map file names >
  :
```
740

FIG. 7E

750  `<CDIST:META HTTP-EQUIV="CDist_Aware" CONTENT="1" />`

FIG. 9A

| |
|---|
| 910  HTTP/1.1 200 OK |
| 912  Content-Type: text/html |
| 914  Cache-Control: CDIST_FILENAME=c:\myWebFiles\aaa.txt |
|      ... message content follows ... |

FIG. 9B

| |
|---|
| 910  HTTP/1.1 200 OK |
| 912  Content-Type: text/html |
| 916  File_Name: c:\myWebFiles\aaa.txt |
|      ... message content follows ... |

FIG. 9C

920  <META HTTP-EQUIV="File_Name" CONTENT="c:\myWebFiles\aaa.txt" />

FIG. 9D

930 `<META NAME="File_Name" VALUE="c:\myWebFiles\aaa.txt" />`

FIG. 9E

```
<BODY>
  ::
  <| File_Name: c:\myWebFiles\aaa.txt -- this is the server's file name >
  ::
```
840

FIG. 9F

950 `<CDIST:META HTTP-EQUIV="File_Name" CONTENT="c:\myWebFiles\aaa.txt" />`

ADDRESSING THE NAME SPACE MISMATCH BETWEEN CONTENT SERVERS AND CONTENT CACHING SYSTEMS

RELATED APPLICATIONS

Patent application Ser. No. 09/969,294 filed Sep. 28, 2001 entitled "Apparatus and Method for Offloading Application Components to Edge Servers"; patent application Ser. No. 09/960,451 filed Sep. 21, 2001 entitled "Method and Apparatus for Minimizing Inconsistency Between Data Sources in a Web Content Distribution System"; and patent application Ser. No. 09/960,448 filed Sep. 21, 2001 entitled "Method and Apparatus for Caching Subscribed and Non-subscribed Content in a Network Data Processing System" are all commonly owned applications related to the present invention.

BACKGROUND OF THE INVENTION

1. Field of the Invention

The present invention relates to distributed computing networks, and deals more particularly with techniques for addressing the name space mismatch between content servers, which typically store content using file names, and content caching systems, which typically store content using Uniform Resource Locators.

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

Millions of people use the Internet on a daily basis, whether for their personal enjoyment or for business purposes or both. As consumers of electronic information and business services, people now have easy access to sources on a global level. Similarly, an enterprise's web-enabled applications may use information and services of other enterprises around the globe. When a human user is the content requester, delays in returning responses may have a very negative impact on user satisfaction, even causing the users to switch to alternative sources. Delivering requested content quickly and efficiently is critical to the success of an enterprise's web presence.

An additional concern in a distributed computing environment is the processing load on the computing resources. If a bottleneck occurs, overall system throughput may be seriously degraded. To address this situation, the content supplier may have to purchase additional servers, which increases the cost of doing business.

One technique which has been developed to address these problems is the use of content caching systems, which are sometimes referred to as "web caches", "cache servers", or "content caches". The goal of a caching system is to store or "cache" content at a location (or at multiple locations) in the computing network from which the content can be returned to the requester more quickly, and which also relieves the processing burden on the back-end systems by serving some requests without routing them to the back-end. Two basic approaches to caching systems are commonly in use. These are called (1) proxies, also known as "forward proxies" and (2) surrogates, also know as "reverse proxies". Each of these will now be described.

A forward proxy configuration is shown in FIGS. 1A and 1B. Forward proxies function in what is known as a "client pull" approach to content retrieval. That is, the forward proxy functions on behalf of the client (for example, an end user's browser or other user agent) to either deliver content to the client directly from the proxy's accessible cache storage, if the requested content is already in the cache, or to request that content from a content server otherwise. FIG. 1A shows a client 100 requesting 105 some content, where this request 105 travels through the Internet 110 and reaches a forward proxy 115. In FIG. 1A, it is assumed that the requested content is not yet available from proxy 115's cache storage 120. Therefore, proxy 115 sends 125 its own request for that content to a content server 130. (For purposes of illustration but not of limitation, a content server is also referred to herein as a "web server"). It may happen that proxy 115 also functions as a load balancing host or network dispatcher, whereby it selects a content server 130 from among several content servers 130, 131, 132 that are available for servicing a particular request. The WebSphere® Edge Server which is available from the International Business Machines Corporation ("IBM") is an example of a solution providing both load balancing and proxy caching. ("WebSphere" is a registered trademark of IBM.) A separate load balancing host might be placed in the network path between proxy 115 and content servers 130, 131, 132 as an alternative. This has not been illustrated in the figures, as the load balancing function is not necessary to an understanding of the present invention.

Returning to the description of the content request scenario, content server 130 obtains the requested content and returns 135 that content to the proxy 115. To obtain the requested content, a particular content server may invoke the services of an Application Server (such as a WebSphere® application server which is available from IBM), where this application server may be co-located with the content server 130 in a single hardware box or may be located at a different device (not shown). The Web server may also or alternatively invoke the services of a back-end enterprise data server (such as an IBM OS/390® server running the DB/2 or CICS® products from IBM), which may in turn access one or more databases or other data repositories. These additional devices have not been illustrated in the figure. ("OS/390" and "CICS" are registered trademarks of IBM.)

After proxy 115 receives the content from the content server 130, proxy 115 returns 140 this content to its requesting client 100. In addition, proxy 115 may store 145 a locally-accessible copy of the content in a data store 120 which is used as cache storage. (There may be cases in which content is marked as "not cachable", and in these cases, the store operation 145 does not occur.) The benefit of using this forward proxy and its data store 120 is illustrated in FIG. 1B.

FIG. 1B illustrates a scenario in which a different client 101 (or perhaps the same client 100) which accesses proxy 115 makes a request 150 for the same content which was requested in FIG. 1A. This request 150 again travels through the Internet 110 and reaches the forward proxy 115. Now, however, assume that the requested content was stored in proxy 115's cache storage 120 following its earlier retrieval from content server 130. Upon detecting that the requested content is locally-accessible, proxy 115 retrieves 155 and returns 160 that content to the requesting client 101. A round-trip from the proxy 115 to the content server 130 has therefore been avoided, saving time and also freeing content server 130 to perform other functions, thereby increasing the efficiency of the back-end resources while providing a quicker response to the requesting client.

As a forward proxy continues to retrieve content for various requests from content servers, it will populate its cache storage with that content. Assuming that the system has sufficient storage to accumulate a proper "working set" of popular content, the ratio of requests which can be served from cache should grow after the initial populating process, such that fewer requests are routed to the back-end.

A surrogate configuration is shown in FIGS. 2A and 2B. Surrogates function in a "server push" approach to content retrieval. That is, a content server pushes content to a surrogate based upon determinations made on the back-end of the network. For example, a content creator might know that certain content is likely to be heavily used, and can configure a content server to push that content proactively to the surrogate, without waiting for clients to request it. Then when requests do arrive from clients, the requests can be served directly from the cache storage without making a request of the back-end resources and waiting for a response. In addition, a content creator using a content management system ("CMS") to create new content or to revise existing content can cause the CMS to notify the content server of the presence of this content, and the content server may push the content to the surrogate in response. FIG. 2A shows a CMS 220 pushing content 215 to content servers 130, 131, 132. A selected one of these content servers 130 is depicted as notifying 210 the surrogate 200 of the new content, which the surrogate then stores 205 in its cache 120. The benefit of using this surrogate and its data store 120 is illustrated in FIG. 2B.

FIG. 2B illustrates a scenario in which a client 100 which accesses surrogate 200 makes a request 230 for content which was pushed out to the surrogate's cache as shown in FIG. 2A. This request 230 travels through the Internet 110 and reaches the surrogate 200. Upon detecting that the requested content is locally-accessible, the surrogate 200 retrieves 235 and returns 240 that content to the requesting client 100. As with the scenario illustrated in FIG. 1B, a round-trip from the surrogate 200 to the content server 130 has therefore been avoided, decreasing response time to the requesting client 100 and reducing the processing load on the back-end system.

In some cases, the functions of a proxy and surrogate are combined to operate in a single network-accessible device. IBM's WebSphere Edge Server is a caching solution that can be configured to function as either a forward proxy or a surrogate, or both. Hereinafter, the term "caching system" is intended to refer to both forward proxies and surrogates.

Content management systems use a content distribution protocol to publish notifications to content servers, and use a protocol such as Hypertext Transfer Protocol ("HTTP") or File Transfer Protocol ("FTP") to move content from an authoring machine to a staging server (or to a production server). Typically, a notification as described herein comprises a content distribution protocol message which is sent from the CMS to one or more content servers, notifying them of new content or changes to previously-distributed content. A CMS knows the file system path with which that content is stored (e.g. at a staging server). This external, file-oriented identifier is the only identifier by which a CMS typically identifies content: the CMS does not typically know the Uniform Resource Locator, or "URL", by which the content will be requested from user agents (referred to equivalently herein as client browsers). This is because of a name space mismatch between the identifiers used at content servers and those used at content caching systems.

Content caching systems use a name space view based on URLs. Content servers and staging servers, on the other hand, store their content using a traditional directory structure (i.e. file path and file name) view wherein the file names relate to physical locations on storage devices. Content servers translate from an incoming URL to a local path and file name (referred to hereinafter simply as a file name for ease of reference) through the use of rewrite rules. The content server retrieves the content from its physical location using the translated file name, and returns that content to the requesting client as a response to the client's request for a particular URL. Because caching systems are positioned in the network path between the requesting client and the content server, they know only the URL for the content, and do not know the associated file name used to store that content at the content server. This is referred to herein as the name space mismatch.

FIG. 3 illustrates the flow of messages in this name space mismatch situation. A user of a content authoring tool 360 may create new content, or revise existing content, and/or determine that previously-published content should be invalidated for one reason or another. That information is then conveyed 350 to a CMS 320 for distribution into the content network. CMS 320 therefore sends a notification message 310 to a content distribution client on content server 130, specifying a file name of the corresponding content. Suppose, for purposes of this example, that caching system 300 also has a content distribution client, and that CMS 320 also sends a notification message 310 to this client. The CMS may also place 330 the new or revised content onto a staging server 340 (which may be located on a separate physical device from the CMS or may be located on the same device.) (Note also that the CMS may have the content authoring tool built in, or may have hooks to invoke it as necessary.) If notification 310 indicates that new or revised content is available, content server 130 uses the file name from the notification to retrieve 370 the content from the staging server 340. However, caching system 300 has no knowledge of how this file name is related to the content stored in its URL-based storage 120, and therefore cannot process the notification message.

Or, if content is to be invalidated (i.e. deleted), the CMS 330 issues an appropriate invalidation message notifying the content server to remove the content from its storage. Caching system 300 cannot process this message, and therefore cannot remove the invalidated cached content from its cache storage.

This prior art approach does not allow caching systems to use notification messages sent by a CMS, and thus the efficiency of the caching system and of the CMS's content distribution operations is impacted. More serious problems may result from the inability of the caching system to respond to content update and invalidation notifications: the caching system may continue to serve content that should have been replaced or removed.

SUMMARY OF THE INVENTION

An object of the present invention is to provide techniques to resolve the name space mismatch between content servers and content caching systems.

Yet another object of the present invention is to improve the efficiency of content caching systems.

Still another object of the present invention is to enable content management systems to interoperate effectively with content caching systems.

A further object of the present invention is to enable content management systems to use a consistent interface for communicating with content servers and content caching systems.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for addressing the name space mismatch between content servers and content caching systems. A file name-to-URL mapping is created for use by content caching systems, and data in protocol response messages (and optionally in protocol request messages) is augmented to transmit information for use in creating this mapping. Several alternative techniques for providing the augmented message information are disclosed. These include, but are not limited to: use of new directives on existing cache-control headers in HTTP messages; addition of new headers in HTTP messages; and use of meta-data in markup languages such as Hypertext Markup Language ("HTML") or Extensible Markup Language ("XML") format.

The present invention may also be used advantageously in methods of doing business, for example by providing content caching systems and/or services wherein the caching system efficiency and/or integrity is improved by taking advantage of notification events from content management systems by using the techniques disclosed herein. Providers of such systems and/or services may offer these advantages to their customers for a competitive edge in the marketplace.

The present invention will now be described with reference to the following drawings, in which like reference numbers denote the same element throughout.

BRIEF DESCRIPTION OF THE DRAWINGS

FIG. 4 illustrates a data structure that may be used to store a URL-to-file name mapping at a content server, according to the prior art;

FIG. 6 illustrates a data structure that may be used to store a file name-to-URL mapping at a caching system, according to the present invention;

FIGS. 7A–7E depict several representative examples of syntax which may be used to augment request messages sent from a content caching system to a content server, according to preferred embodiments of the present invention; and FIGS. 9A–9F depict several representative examples of approaches for syntax which may be used by a content server to augment response messages delivered to content caching systems, according to preferred embodiments of the present invention.

DESCRIPTION OF PREFERRED EMBODIMENTS

The present invention provides techniques for resolving the name space mismatch between URL-based content caching systems and file name-based content servers. As will be discussed in more detail below, a file name-to-URL mapping is created for use by content caching systems, and data in protocol response messages (and optionally in protocol request messages) is augmented to transmit information for use in creating this mapping.

The disclosed techniques enable content management systems to propagate update notifications and invalidation notifications not only to content servers which use file-based naming conventions, but also to content caching systems which use URL-based naming. These notifications may use a common interface format, whether they are destined for a content server which traditionally understands file-oriented names or for a content caching system which traditionally does not.

In preferred embodiments, implementations of the present invention may operate as plug-ins or filters in the network path of the content caching systems and content servers. Use of plug-ins is a technique which is generally known in the art for adding functionality to an existing device without modifying the device itself. (Use of plug-ins for the purposes disclosed herein is not known in the art, however.) Alternatively, the implementation of such systems and/or servers may be directly modified to include the techniques disclosed herein. Implementations of the present invention are discussed herein with reference to logic that may operate in either scenario.

The approach used by the present invention has a number of advantages. As one example, the cost and complexity of deploying a CMS is reduced through use of a consistent interface for communicating with content servers and with caching systems. As another example, a CMS may perhaps scale more easily when it operates in this manner. In addition, the content served from the content cache may be more reliable because the caching system can respond to update and invalidation notifications from a CMS.

Figure 1A:
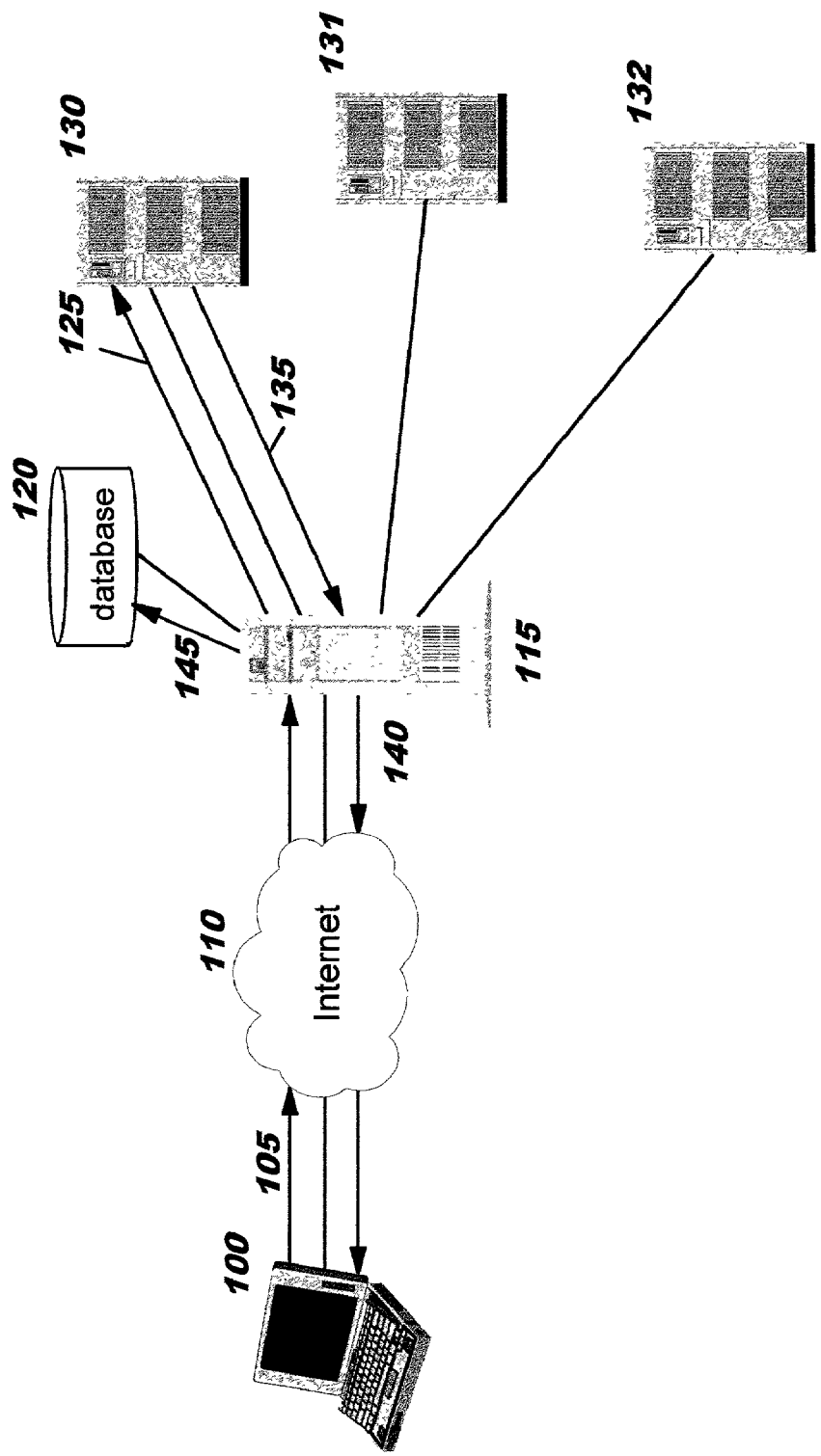
FIGS. 1A and 1B illustrate a forward proxy caching environment, according to the prior art.
Figure 1B:
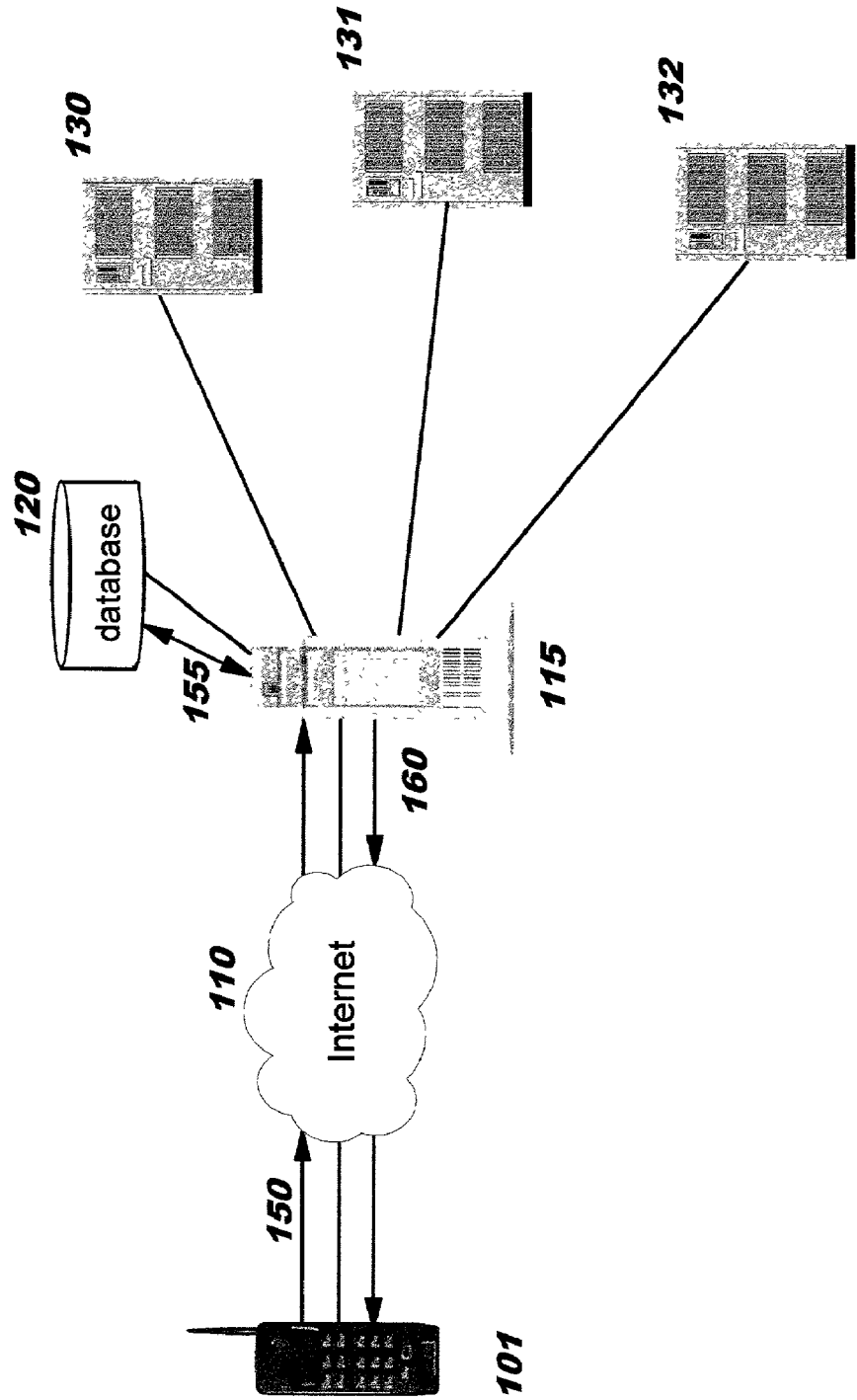
Figure 2A:
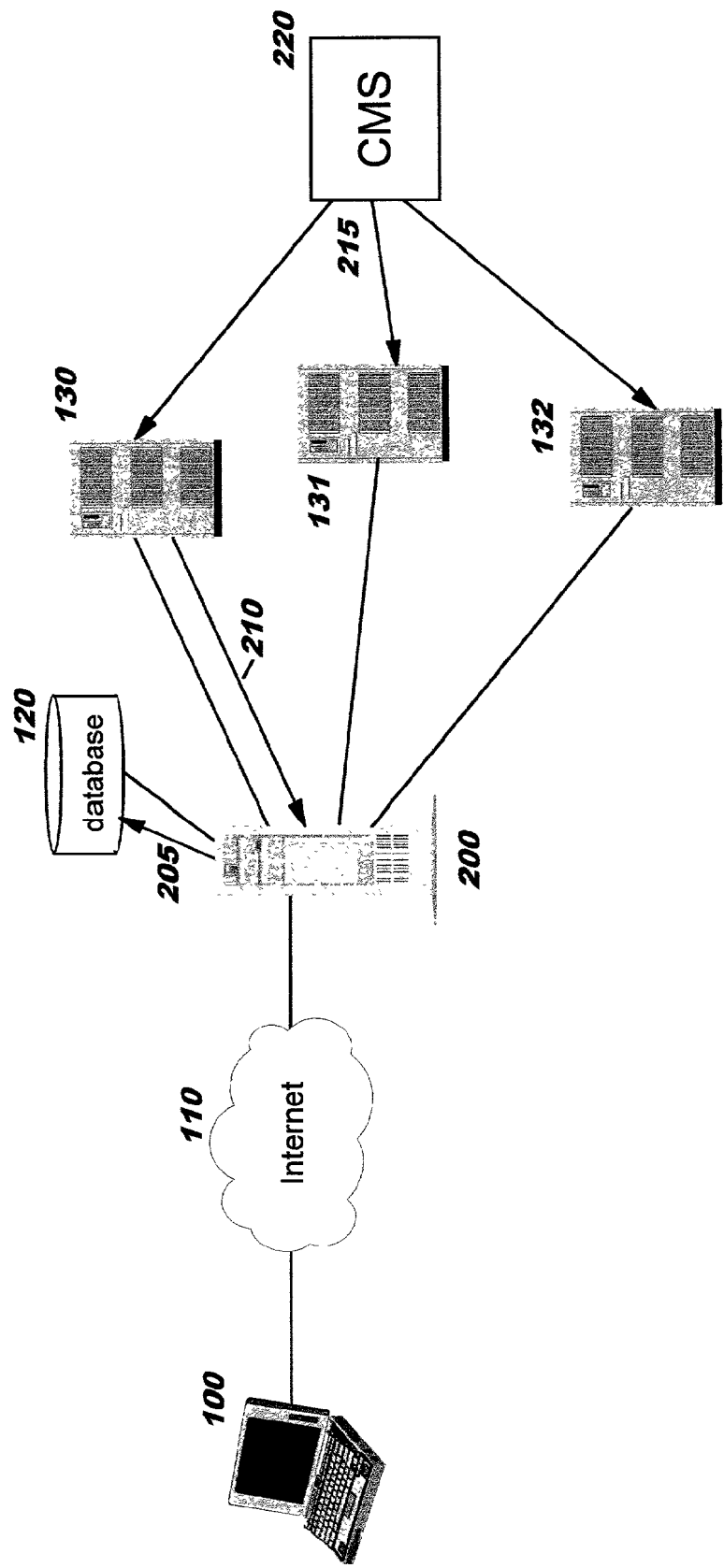
FIGS. 2A and 2B illustrate a surrogate (reverse proxy) caching environment, according to the prior art.
Figure 2B:
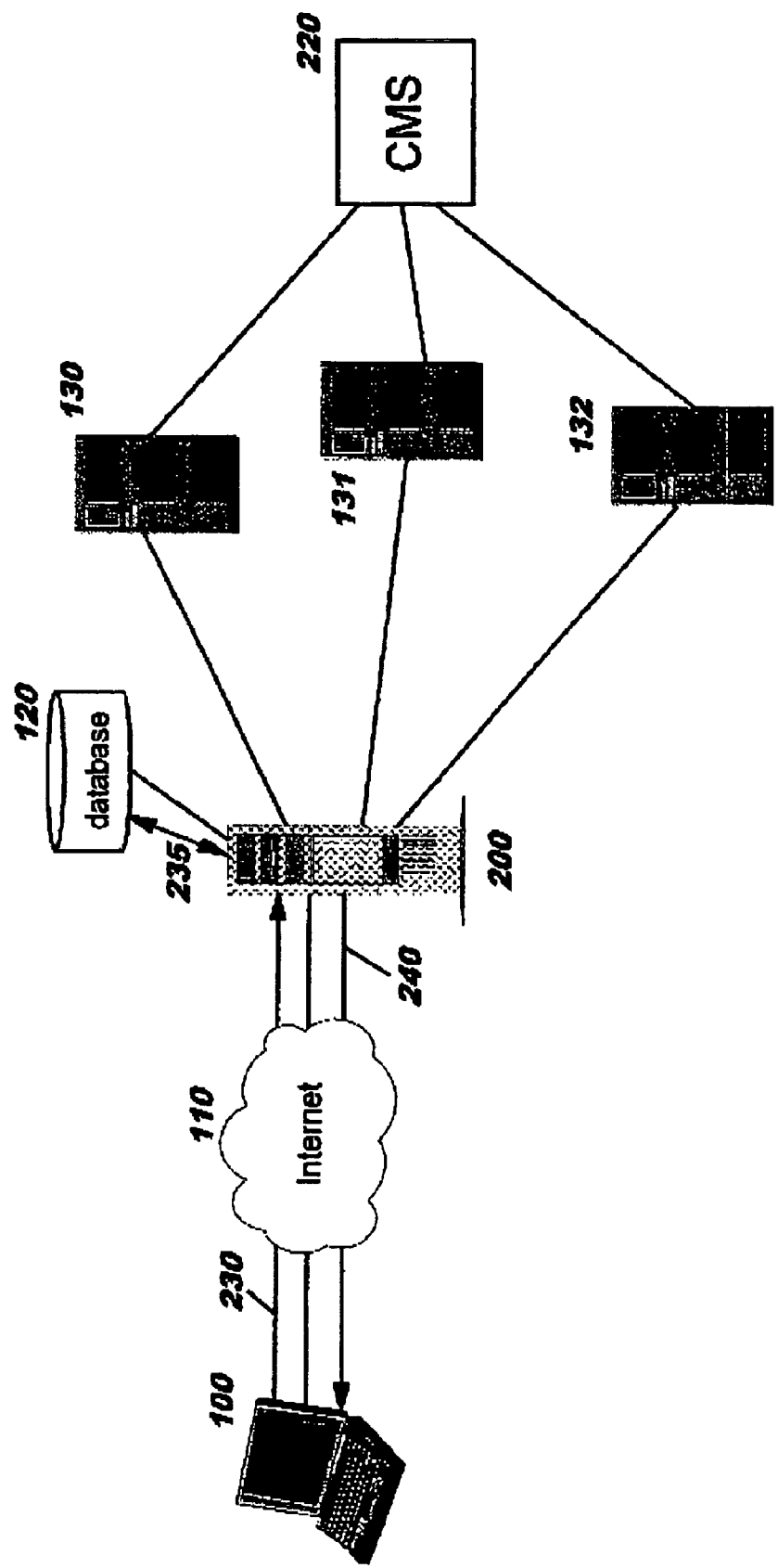
Figure 3:
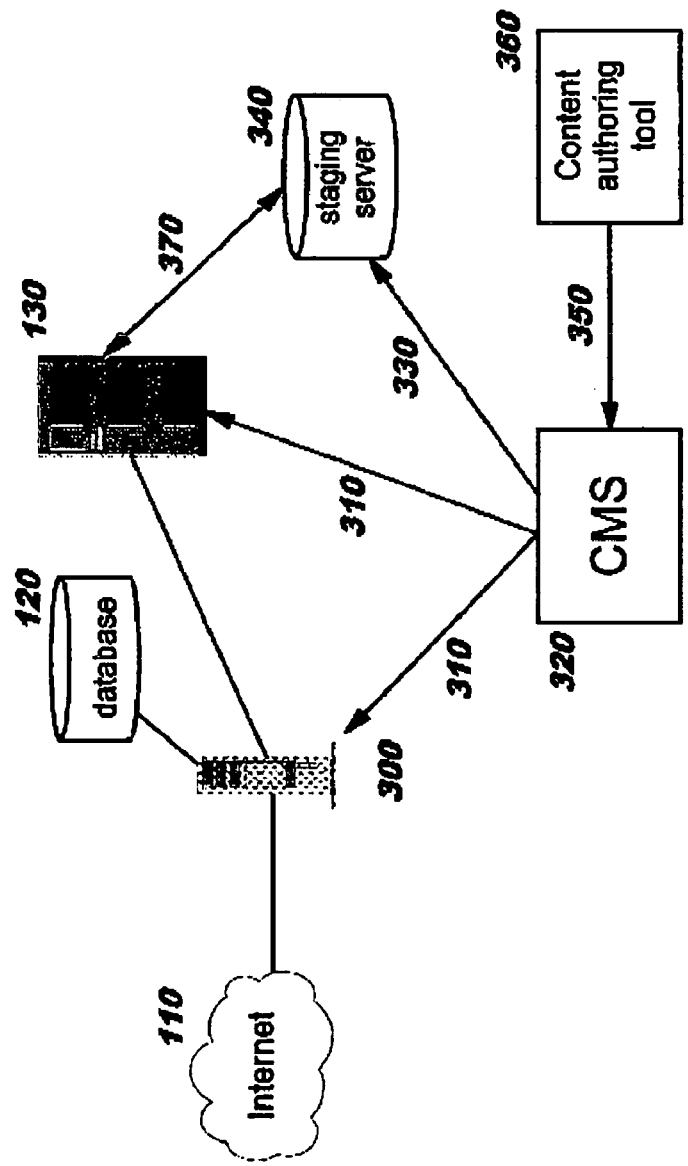
FIG. 3 is a diagram used to discuss the problem of name space mismatch between content caching systems and content servers in the prior art.

Content servers of the prior art use URL-to-file name mappings which may be stored, for example, in data structures such as lookup tables. A simple example of such a table is shown in FIG. 4. When a content server receives a notification from a CMS that a file has been updated, a content distribution client (or analogous functionality) at the content server typically acquires the file by making a request to a staging server and then installing the file in the content server's file system. This was illustrated with reference to FIG. 3. (It should be noted that references herein to retrieving content from a staging server are for purposes of illustration and not of limitation. Alternatively, content may be requested from different sources, such as from a production server. In addition, in some scenarios, more than one source for content may be involved, such as multiple staging servers.) It may happen that more than one URL refers to a single file. The URL-to-file name mapping rules at a content server will therefore cause a stored file to be served out if any of a certain set of URLs is requested. With reference to the example in FIG. 4, several sample mappings are provided for purposes of illustration. As shown therein, the sample URLs 420, 430, and 440 are all mapped to the same file name and thus the content stored at file space address "d:\legal_files\copyright\main.html" (see elements 421, 431, 441) will be served upon receiving a request for any of these URLs. The URL rewriting rules which are in effect provide for this result. (in the example, the various URLs are designed to represent different ways of requesting information about copyrights and trademarks.) However, one URL may only be mapped to or associated with one file name. See, for example, elements 450 and 451, which illustrate that in response to receiving a request for URL 450, which has the form "ftp://abc.def.com/wyz", the content of a file "c:\myWebFiles\aaa.jpg" will be served using these mappings.

Suppose that the content of file "d:\main_files\home_page.htm" 411, which in this example mapping denotes a markup language file used in rendering a home page for IBM, is changed using the CMS. The CMS will issue an update notification to the content servers using this file name, and the updated content can then be retrieved and used to replace the existing content in the file systems of those servers. The CMS will be unable, however, to successfully notify prior art caching systems to update (or, similarly, to invalidate) their cached content, because prior art caching systems know this same content only by its corresponding URL "http://www.ibm.com" 410. (That is, the URL 410 is used for retrieving the markup language file, assuming that the URL itself is used as a key for the cache storage. In some caching system implementations, transformations may be performed on an incoming URL to obtain the cache lookup key. This alternative lookup approach does not materially impact the discussion of the present invention, and it will therefore be assumed hereinafter that the URL is used as the lookup key without being transformed. The manner in which a transformed URL may be used instead will be obvious to one of ordinary skill in the art.)

The present invention solves the name space mismatch problem of the prior art by dynamically and automatically learning the file name-to-URL mapping for content cached by a caching system. When an update notification or invalidation notification message arrives from a CMS and uses a file name, the caching system will now be able to consult its stored mapping to determine which URL or URLs are associated with that file name. The caching system can then retrieve the replacement content (in the case of an update notification) using the associated URL(s), and replace the content in cache storage. Subsequent requests for the URL(s) associated with the replaced content are then automatically served using the revised content. Similarly, in the vase of an invalidation notification, the caching system will know which of its URLs should have their content invalidated even though that content has been identified by file name.

Figure 5:
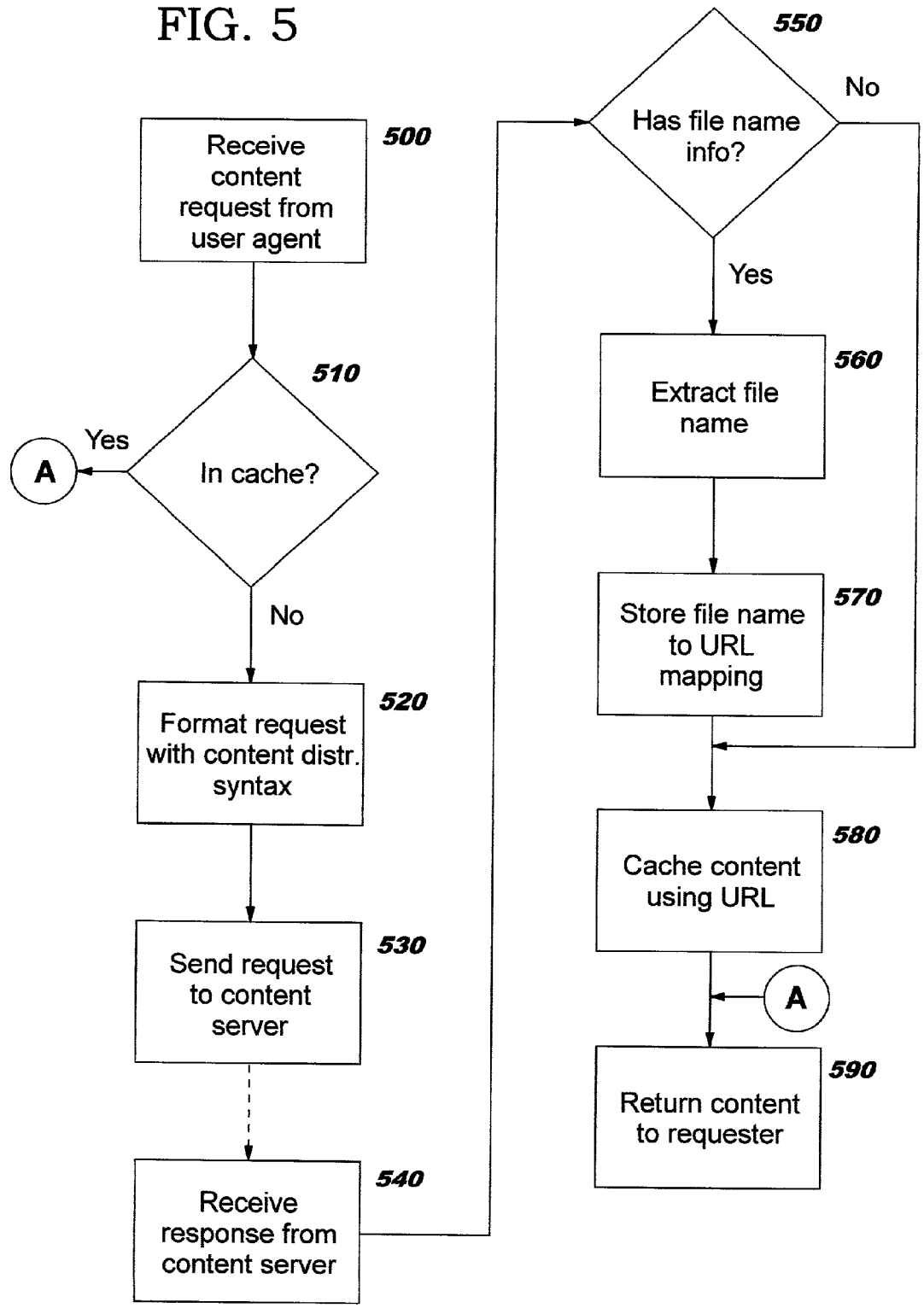
FIGS. 5, 8, 10, and 11 are flowcharts illustrating logic which may be used to implement preferred embodiments of the present invention.

FIG. 5 illustrates logic underlying the processing performed to serve a client's incoming content request at a caching system according to preferred embodiments. The process begins at Block 500, where the content request arrives from the user agent or other client. (The request might alternatively arrive from a downstream caching system; the processing of FIG. 5 handles this case as well.) Block 510 checks to see if the requested content can be found in cache, using the URL from the request. If this test has a positive result, then control transfers to Block 590 where the content is served from cache, and the processing of this request is then complete. If the test in Block 510 has a negative result, however, then a "cache miss" occurs. (As is known in the art, the term "cache miss" refers to the situation where a caching system finds that it cannot serve a content request from cache, and must instead contact a content server.)

Cache miss processing according to the present invention enables the caching system to automatically and dynamically learn the information used to populate its file name-to-URL mapping. A simplified example 600 of a data structure which may be used to store this mapping is shown in FIG. 6. As can be seen, the file name-to-URL mapping created by the caching system takes the reverse form of the content server's URL-to-file name mapping (illustrated in FIG. 4). As was discussed with reference to table 400, sample table 600 shows that one file name, such as "c:\myWebFiles\aaa.txt" (appearing in elements 610, 620, and 630), may in some cases map to more than one URL (see elements 611, 621, 631). Elements 640 and 641 illustrate an entry having a one-to-one mapping between the file name and URL.

Note that while the data structure 600 is depicted as a table, this is for purposes of illustration and not of limitation. Other techniques for storing the mappings may be used, such as linked lists and so forth. Such alternative techniques will be well known to those of skill in the art.

Returning now to the discussion of FIG. 5, preferred embodiments of the cache miss processing at the caching system insert a content distribution flag (i.e. value) into a content request (Block 520) prior to sending this request to a content server (Block 530). The purpose of this content distribution flag is to notify the receiving content server that this content caching system is "content distribution aware"—that is, if informed of the file name associated with returned content, this caching system can make use of that information. In these preferred embodiments, the content distribution flag may be represented using headers or meta-data syntax, as will be described with reference to FIGS. 7A through 7E. In alternative embodiments, this content distribution flag may be omitted, and content servers according to the present invention may be adapted to always transmit the file name with returned content. Those caching systems which do not understand this information may then discard it. It may be assumed for purposes of the following discussion that a "true" or "yes" value is specified in the header or meta-data syntax created in Block 520.

Several alternative syntax formats may be used for the content distribution flag of the present invention. In one approach, an HTTP GET request message (or, alternatively, a message which is semantically similar to HTTP GET in another protocol) is augmented with an HTTP header and value providing this information. In other approaches, meta-data information is included in the request message to indicate this information. The HTTP specification is entitled "Hypertext Transfer Protocol—HTTP/1.1" (June 1999), and is published as Request For Comments ("RFC") 2616 from the Internet Engineering Task Force ("IETF"). References hereinafter to HTTP GET are to be considered as representative of messages in other protocols (such as the Wireless Session Protocol, or "WSP").

FIGS. 7A through 7E illustrate several different syntax formats that may be used for conveying a content distribution flag within an HTTP GET request message, by way of example. Other approaches may be used alternatively, including but not limited to conveying the information within one or more cookies of the request header.

FIG. 7A illustrates an example of specifying a content distribution flag using HTTP syntax directly. The examples in FIG. 7B through 7D represent three formats that may be used in HTML syntax. The example in FIG. 7E uses XML syntax. These examples will now be discussed in more detail.

Use of the HTTP header syntax, as illustrated in FIG. 7A, augments an HTTP GET request such as "GET http://www.ibm.com/abc.html HTTP/1.1" 710. In this example 700, the content distribution flag header has the syntax "CDist_Aware:" and a value of "Yes" (see element 714). The particular header syntax, and the manner in which values are expressed, may vary from one implementation to another. (FIGS. 7B, 7C, and 7E, for example, treat the value as a Boolean, and indicate a "TRUE" value with the integer value "1".) The request header 700 shown in FIG. 7A indicates the following information: (1) this is a request for the content corresponding to URL "http://www.ibm.com/abc.html", and this message is encoded using HTTP 1.1 (see element 710); (2) the content type, in this example, is "text/html" (see element 712); and (3) this requester is content-distribution aware (see element 714).

Meta-data using markup languages, such as HTML and XML, may be used as alternatives to the format shown in FIG. 7A. For HTML, one example of an alternative format uses the "HTTP-EQUIV" attribute on a "META" tag, as shown at 720 in FIG. 7B. In this example, the syntax "CDist_Aware" has been used as the value of the HTTP-EQUIV attribute to name the content distribution flag, and a value of "1" is provided as the corresponding value of the flag, thereby conveying information which is analogous to element 714 in FIG. 7A. A META element (such as element 720 in FIG. 7B) may be used to identify properties of a document. An HTTP-EQUIV attribute on a META tag may be used in markup language documents to explicitly specify equivalent information that an HTTP server should convey in the HTTP response message with which the document is transmitted. Information on the META tag can be found in RFC 2518 from the IETF, which is entitled "HTTP Extensions for Distributed Authoring—WEBDAV" (February 1999). In addition, a discussion of this syntax construct may be found in a Web-published article titled "HTML's META-tag: HTTP-EQUIV", A. Richmond (date unknown), located on the Internet at http://wdvl.com/Authoring/HTML/Head/Meta/HTTP.html.

Another example of an alternative format for use with HTML documents is the META tag with a "NAME" attribute, rather than an HTTP-EQUIV attribute. This alternative is illustrated in FIG. 7C at element 730. The NAME attribute on a META tag or element identifies a property name, and the VALUE attribute then specifies a value for that named property. For more information on use of the NAME attribute, refer to RFC 2518 or to http://wdvl.com/Authoring/HTML/Head/Meta on the Internet.

A third example of an alternative format for use with HTML documents uses specially-denoted comments within the body of an HTTP GET request message, as illustrated at 740 in FIG. 7D. As shown therein, this example uses a keyword "CDist_Aware" followed by a colon, followed by a text string value.

With XML documents, a namespace is preferably used to introduce a tag set for conveying content distribution information, and may be designed to resemble the HTML markup if desired. An example of this approach is shown at 750 in FIG. 7E, where a tag value "CDIST" denotes that this document element corresponds to a content distribution tag set which has been defined to include the META, HTTP-EQUIV, and CONTENT keywords which are specified on example tag 750.

Figure 8:
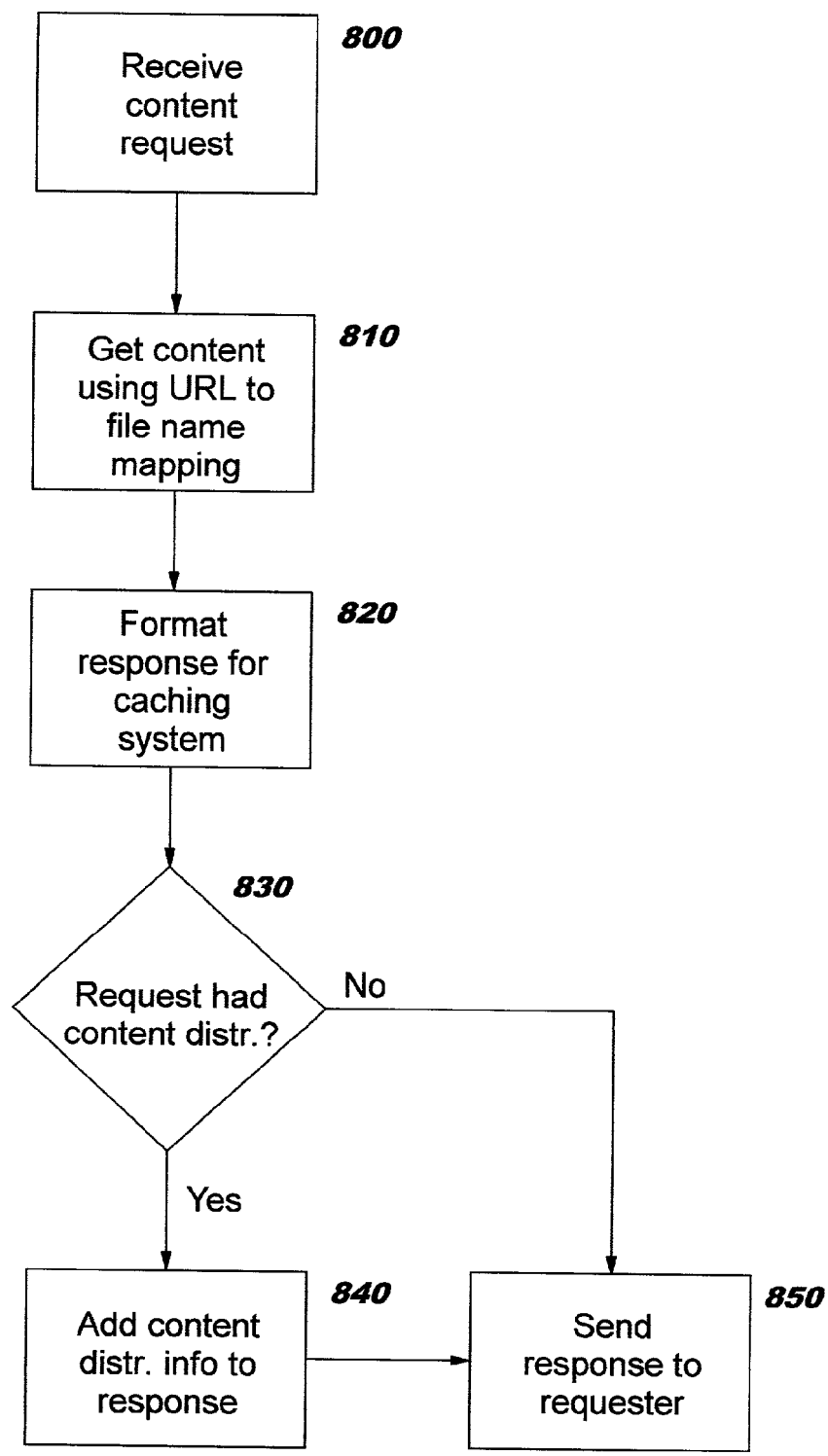

Returning again to the discussion of FIG. 5, after the content request has been transmitted in Block 530, some relatively short amount of time may pass, after which the content is returned in a response message from the content server (Block 540). Logic underlying the processing performed in preferred embodiments at a content server to create that response message is depicted in FIG. 8, which will now be described. As shown therein, a content request is received from the caching system (Block 800). The content is obtained (Block 810) and a response message is formatted (Block 820) for returning that content to the requester. In preferred embodiments, a test is made at Block 830 to see whether the request message contained an indication that the requester is content distribution aware. (Refer to the discussion of FIGS. 7A–7E, above, for more information on the augmented request messages.) When this test has a positive result, content distribution information is added to the response header at Block 840, as discussed in more detail below with reference to FIGS. 9A through 9F; otherwise, the processing of Block 840 is bypassed. As discussed earlier with reference to Block 520 of FIG. 5, alternative embodiments may presume that the caching system is content distribution aware, in which case the test in Block 840 may be omitted and the processing of Block 840 is performed in all cases. Following the processing of Block 840, and when Block 840 is not performed, Block 850 sends the HTTP GET response to the requesting caching system, and the processing of FIG. 8 ends.

The content distribution information added to the response message in Block 840 may be expressed in several alternative ways. The information comprises an identification of the file from which this content was obtained, and may use the file name itself. Returning this information to the caching system enables the caching system to populate its file name-to-URL mapping (which was described with reference to FIG. 6). It may happen, however, that an implementation of the present invention chooses not to expose the name of the file (for example, for security purposes). In such cases, a substitute version of that file name may be used. Preferably, the substitute file name is created by encrypting or otherwise encoding the actual file name. (Hereinafter, references to the file name when discussing the content distribution information added by the content server are intended to include other forms of content identification such as encrypted or encoded file names.)

Public key cryptography or private (shared) key cryptography may be used for creating an encrypted file name as a substitute for the actual file name. In a public key system, the content server uses a public key to encrypt the actual file name, and transmits that encrypted file name to the caching system. The public key may be that of the CMS, or of the content server, or perhaps of the caching system, depending on whether a decryption operation is needed. Decryption is described below. The caching system then stores the encrypted file name in its mapping information. When the CMS sends a notification to the caching system pertaining to a particular file name, the CMS uses the same public key to encrypt that file name. The caching system then uses the encrypted value received from the CMS as a key to index into its mapping information to extract the associated URL—that is, as a file name value 602 used to extract an associated URL value 604. In this manner, the substitute for the file name can be sent to caching systems without publicly exposing information about the actual file structure used by a content server. In a private key system, on the other hand, the content server must use a secret key value which is shared with the CMS to perform the encryption of the file name being sent to the caching system, and the CMS then uses this same shared key to encrypt file names being sent on notifications to the caching system.

Note that in preferred embodiments, when a caching system receives an update notification from a CMS, that update proceeds as if a cache miss has occurred. That is, the caching system's mapping information is consulted to determine the URL of the content to be updated, based upon the file name from the notification message. This URL is then used to create a content request which is sent to a content server. Therefore, if the content server remembers the encrypted file name-to-actual file name mapping, then a decryption of the file name received from the caching system is not necessary: a simple lookup can be used. In alternative embodiments, if the content server does not retain information regarding the encrypted file names, then a decryption process is needed. This requires that encryption is performed using the content server's public key, when using public key encryption, so that the content server can decrypt the received file name using its private key. Or, when shared key cryptography is used, the content server decrypts the file name using the key it shares with the CMS. (Techniques for performing this decryption will be obvious to those of skill in the art.)

Several alternative examples of the syntax used to specify the file name information at Block 840 an shown in FIGS. 9A through 9F. The choice of syntax format for the response messages preferably mirrors the format used by a content caching system on the request messages to convey that it is content distribution aware; alternatively, a different syntax format may be used by the parties for request messages and response messages, without deviating from the scope of the present invention.

FIGS. 9A and 9B illustrate two examples of syntax which may be used to specify a file name using HTTP syntax directly. The examples in FIG. 9C through 9E represent three formats that may be used in HTML syntax, and the example in FIG. 9F uses XML syntax. These examples will now be discussed in more detail.

FIGS. 9A and 9B illustrate use of a header in an HTTP GET response message returned by a content server to a requester when transmitting the requested content. In these examples, the response headers indicate the following information: (1) the status is "OK" (see element 910); (2) the content type of this response message is "text/html" (see element 912); and (3) the file name associated with this content is "c:\myWebFiles\aaa.txt" (see elements 914 and 916). The "Cache-Control" header shown at 914 of FIG. 9A is a header defined in the prior art for specifying directives pertaining to caching. (Refer to section 14.9, "Cache-Control", of the HTTP specification for a description of this header.) The "CDIST_FILENAME" is an extension defined according to the present invention for conveying a file name for content distribution purposes. The value of this extension specifies the file name associated with the content transmitted with the response message. (Refer to section 14.9.6, "Cache Control Extensions", for a discussion of the extension mechanism with which directives may be used to extend the cache-control header.) FIG. 9B illustrates use of a "File_Name" header 916, defined according to the present invention to convey content distribution file name information. (As will be obvious, "File_Name" is merely one example of syntax that may be used for this purpose. Similarly, names other than those illustrated herein may be used in the header and meta-data syntax without deviating from the scope of the present invention.)

FIG. 9C shows how an HTML META tag with an HTTP-EQUIV attribute may be used to encode a file name (see element 920), and expresses semantically identical information as the examples in FIGS. 9A and 9B. FIG. 9D shows how this file name information may be encoded using an HTML META tag with a NAME attribute, illustrated at element 930. FIG. 9E provides a third example of a format for use with HTML documents, in which the file name value is specified using specially-denoted comments within the body of an HTTP GET response message, as illustrated at 940. As shown therein, the example uses a keyword "File_Name" followed by a colon, followed by a text string value.

Finally, an XML syntax example is illustrated in FIG. 9F. As discussed with reference to FIG. 7E, a namespace is preferably used to introduce a tag set for conveying content distribution information, including file name values in response messages. An example of this approach is shown at 950 in FIG. 9F, where the XML syntax has been designed to resemble the HTTP-EQUIV meta-data syntax of FIG. 9C.

In some situations, a single file may be available from more than one content server, and thus it may be necessary to identify that file as to the domain from which it was received. For example, if a file "ABC" is available from content server "PQR" as well as from content server "XYZ", then the caching system may track whether a file to be changed in response to an update notification is the file from PQR or the file from XYZ. To address these cases, an optional aspect of the present invention augments the file name-to-URL mapping with an indication of the source domain, and this domain information is preferably specified on the response message sent by the content server during the processing of FIG. 8. It will be obvious to one of ordinary skill in the art how the syntax illustrated in FIGS. 9A–9F may be changed to add this additional information. For example, with reference to FIG. 9A, an additional cache-control header may be added, or a multi-valued cache-control header may be used which includes the domain as well as the file name. With reference to FIG. 9C, as another example, an additional <META> tag may be included to convey the domain information.

Continuing again with the discussion of FIG. 5, after the caching system receives the requested content from the content server at Block 540, Block 550 checks to see if the response message includes a file name specified (for example) as a header or meta-data. If there is no file name information, then processing continues at Block 580; otherwise, Block 560 extracts the file name value. The manner in which this information is extracted depends on how it was formatted, as will be obvious. Refer to the discussion of FIGS. 9A through 9F, above, for a detailed discussion of that formatting.

The extracted file name is used to populate the caching system's mapping information (Block 570). The caching system is aware of the URL for which this content was returned, according to prior art techniques, and thus uses this URL value along with the file name information provided according the present invention to create a file name-to-URL entry in the mapping (see table 600 of FIG. 6).

The content is cached (Block 580) using its URL, and is also returned (Block 590) to the requesting client. In preferred embodiments, content distribution headers and/or meta-data values are forwarded along with this response message. Thus, if the requesting client is another caching system, this information may be used to populate the file name-to-URL mapping of that caching system as well. After the content is returned, the processing of FIG. 5 ends.

It should be noted that the order of operations depicted in FIG. 5 may be altered, as desired (for example, to further reduce the response time to the requesting client). For example, the processing depicted at Block 590 might be moved to immediately follow Block 540 to return a response to the client immediately upon receiving the requested content. Similarly, the processing of Block 580 might be moved to precede the processing of Blocks 550 through 570 in order to make the newly-received content available for serving from cache to subsequent requesters sooner. Furthermore, it should be noted that response messages specifying that their content is not cachable have not been addressed by the logic flow in FIG. 8. (Such processing is known in the art, and the manner in which these considerations may be added to the logic in FIG. 8—for example, to bypass creation of a mapping entry for non-cachable content—will be obvious to one of ordinary skill in the art.)

Figure 10:
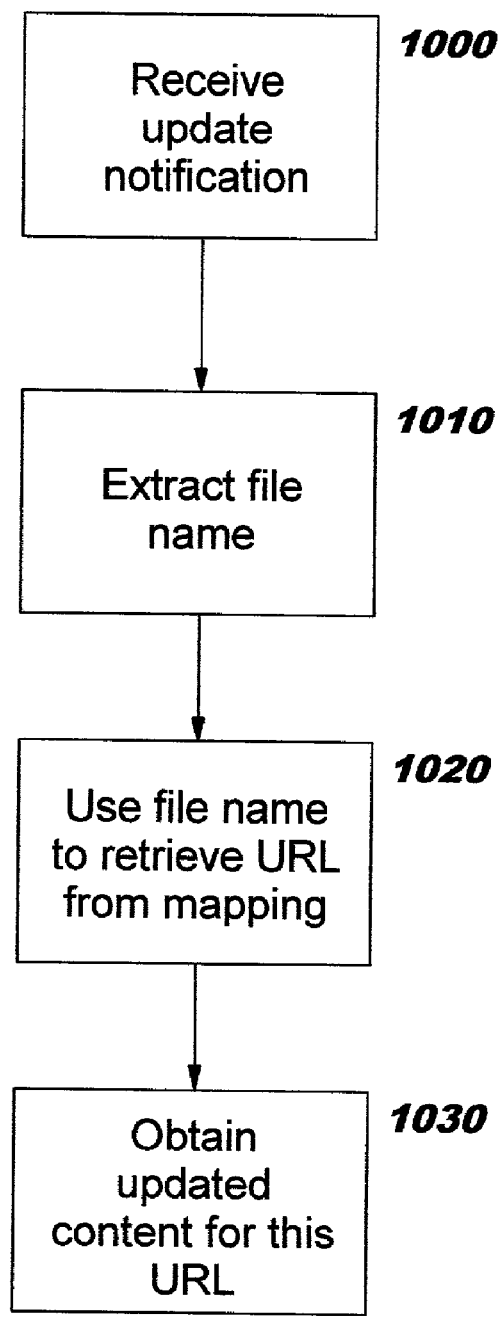

As has been demonstrated, the present invention enables a caching system to automatically and dynamically populate a mapping of file names to URLs for the content cached by that system. The manner in which this mapping enables the content caching system to respond to an update notification is illustrated in FIG. 10. When a notification of updated content subsequently arrives from a CMS (Block 1000), and this notification specifies the name of the file, the file name can be extracted (Block 1010) and used to consult the caching system's mapping to determine the URL corresponding to that file name (Block 1020). Upon obtaining the URL, the caching system, in its role as a content proxy, can send a content request to the content server using that URL to obtain the updated content for the URL (Block 1030). This processing proceeds according to the processing for a cache miss, as has been described with reference to FIGS. 5 and 8 (beginning at Block 520 of FIG. 5).

Figure 11:
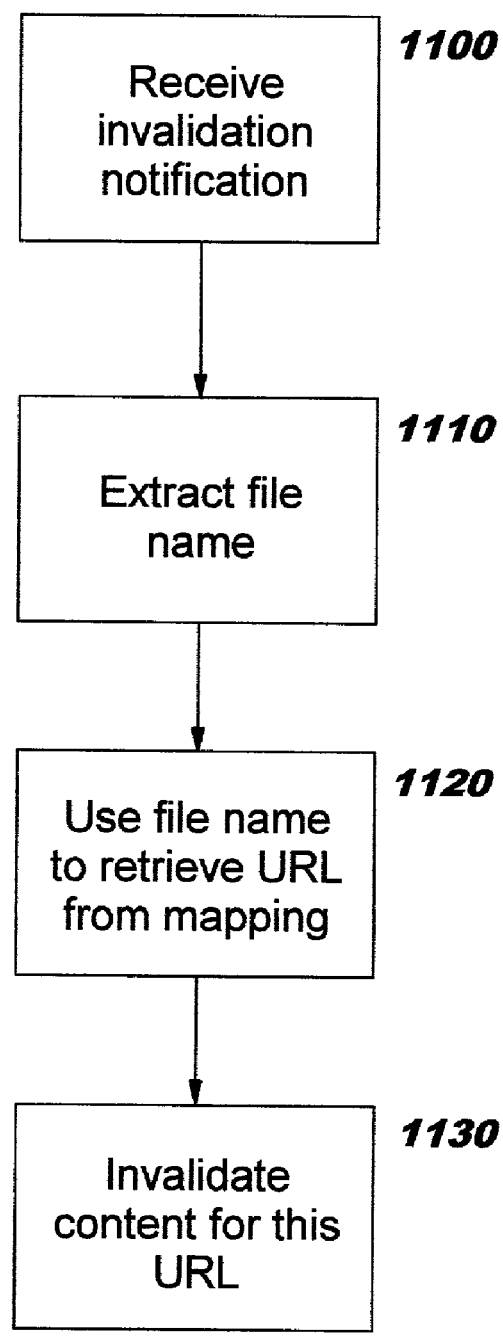

To handle a content invalidation notification sent to a caching system from a CMS, a caching system according to the present invention also uses the file name in this notification to consult its stored mapping. Processing of an invalidation notification by the content caching system is illustrated in FIG. 11. After an invalidation notification arrives (Block 1100), the file name is extracted (Block 1110) and used to locate the corresponding URL from the mapping (Block 1120). This URL is then used for invoking an invalidation message of the cache control application programming interface ("API") (Block 1130) to invalidate the cached content. Because the mapping created as disclosed herein enables determining the corresponding URL, URL-based cache invalidation messages of prior art APIs can be used for this purpose without change.

It should be noted that if a particular file name is associated with more than one URL in the caching system's file name-to-URL mapping, then content requests for each of the URLs are preferably sent to the content server when processing an update notification, and the invalidation API is preferably invoked for each URL when processing an invalidation notification. If a domain name value is specified, then the update or invalidation may be limited to the content pertaining to that domain name.

In both the update notification and invalidation notification scenarios, it may happen that no stored mapping is found for the file name specified in the notification. In these cases, the notification message may be ignored. As an alternative, error handling may be invoked if desired.

Note that when invalidation notification messages use encrypted file names, a corresponding decryption process is not necessary in order to invoke the cache invalidation API. The encrypted file name is simply used to access the caching system's mapping, and the retrieved URL can be used unchanged when invoking the API.

The disclosed techniques may also be used to implement improved methods of doing business. For example, content caching systems may be provided wherein the content can now be managed in an improved manner using the techniques disclosed herein, as the caching system can now respond to update and invalidation notification messages sent by a CMS. Content caching services may be offered which make use of the present invention, thereby enabling users of such systems to benefit from the increased system efficiency and/or integrity.

To the best of the inventors' knowledge and belief, an integrated content caching and content management system from InfoLibria provides for caching systems to respond to CMS notifications. However, it is believed that the approach taken therein is to expose the caching system's URL to the CMS, and then to use this URL when sending notifications to caching systems. One drawback of such an approach occurs if a URL changes: the change must be propagated to, and coordinated with, the CMS, or the system will effectively break with regard to that content. The technique of the present invention does not have this dependency, and its dynamic learning approach is therefore more flexible and more reliable. Another drawback of such an approach is that a CMS must use two different interfaces for communicating notification messages: a URL-based interface for sending notifications to caching systems, and a file-based interface for sending notifications to content servers. This increases the cost and complexity of deploying a CMS, and may limit the scalability of the CMS as well.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. In particular, the disclosed techniques may be adapted to resolve a name space mismatch between forms of content identification other than file names and URLs, and markup languages other than HTML and XML may be used for expressing content distribution information. Furthermore, while preferred embodiments presume that update and invalidation notifications originate from a CMS, the invention operates equivalently when such notifications originate from another source or sources. Therefore, it is intended that the appended claims shall be construed to include the preferred embodiments and all such variations and modifications as fall within the spirit and scope of the invention.

What is claimed is:

1. A method of addressing a name space mismatch between content servers and content caching systems, comprising steps of:
   caching one or more content elements in a content caching system, wherein the cached elements are identified by the content caching system using a uniform resource locator format;
   automatically learning mappings between a directory structure format and the uniform resource locator format, responsive to receiving the content elements for caching, wherein the received content elements are identifiable to the content caching system using the uniform resource locator format but also have associated therewith identifiers in the directory structure format, the mapping for each received content element storing its identifier in the uniform resource locator format and its associated identifier in the directory structure format; and
   using the mappings when updating one or more selected cached content elements, responsive to receiving notifications of changed content elements that identify the changed content elements using the directory structure format, by requesting, by the content caching system, updated versions of the selected cached content elements from a content server, wherein each request identifies one of the selected cached content elements using the identifier, in the uniform resource locator format, from the mapping that stores the identifier, in the directory structure format, from the received notification for that content element.

2. The method according to claim 1, further comprising the step of using the mappings to invalidate one or more particular cached content elements by invoking an invalidation function for the content caching system, by the content caching system responsive to receiving notifications of invalid content elements that identify the particular content elements using the directory structure format, wherein each invocation identifies one of the particular cached content elements using the identifier, in the uniform resource locator format, from the mapping that stores the identifier, in the directory structure format, from the received notification for that content element.

3. A method of addressing a name space in mismatch between content servers and content caching systems, comprising steps of:
   automatically learning mappings between a directory structure format which identifies content elements accessible from one or more content servers and a uniform resource locator format which identifies content elements cached by a caching system, when the caching system receives the content elements from the content servers for caching, wherein the received content elements are identifiable to the caching system using the uniform resource locator format and also have associated therewith corresponding identifiers in the directory structure format, the mapping for each received content element storing its identifier in the uniform resource locator format and its corresponding identifier in the directory structure format;
   receiving, at the caching system, a notification pertaining to one of the cached content elements, wherein the notification identifies the content element using its identifier in the directory structure format;
   consulting the learned mappings using the identifier in the directory structure format from the notification, thereby determining the corresponding identifier in the uniform resource locator format; and
   processing the received notification using the corresponding identification in the uniform resource locator format.

4. The method according to claim 3, wherein:
   the identifier in the directory structure format identifies more than one of the cached content elements;
   the consulting step determines corresponding identifiers, in the uniform resource locator format, of the more than one identified cached content elements; and
   the processing step processes each of the identified cached content elements using the corresponding identifiers in the uniform resource locator format.

5. The method according to claim 3, wherein the notification is a content update notification.

6. The method according to claim 3, wherein the notification is a content invalidation notification.

7. The method according to claim 3, wherein the notification is received from a content management system.

8. The method according to claim 3, wherein a plurality of notifications are received, the plurality comprising at least one content update notification and at least one content invalidation notification, and wherein the plurality of notifications use the directory structure format for conveying the notifications to the content caching system and also to the content servers.

9. The method according to claim 3, wherein the automatically learning step operates when the content elements are received during cache miss processing.

10. The method according to claim 3, wherein the corresponding identifier directory structure format is specified, for each of the received content elements, in a response message with which the content element is received.

11. A method of addressing a name space mismatch between content caching systems and content servers, comprising steps of:
   sending a content request from a content caching system to a content server, wherein the content request identifies requested content using a first identifier in a uniform resource locator format;
   receiving a content response at the content caching system from the content server, wherein the content response provides the requested content, identifiable using the first identifier, and is augmented with a second identifier of the requested content in a directory structure format; and
   creating an entry in a mapping, responsive to the receiving step, wherein the entry maps the second identifier in the directory structure format to the first identifier in the uniform resource locator format.

12. The method according to claim 11, wherein the content request signifies an ability to process the augmented content response.

13. The method according to claim 12, wherein the ability is signified using a message header of the content request.

14. The method according to claim 13, wherein the message header specifies that the caching system is content distribution aware.

15. The method according to claim 13, wherein the message header is a Hypertext Transfer Protocol ("HTTP") header.

16. The method according to claim 12, wherein the ability is signified using syntax of a markup language.

17. The method according to claim 16, wherein the markup language is Hypertext Markup Language ("HTML").

18. The method according to claim 17, wherein the syntax comprises a "META" tag using an "HTTP-EQUIV" attribute syntax.

19. The method according to claim 17, wherein the syntax comprises a "META" tag using a "NAME" attribute syntax.

20. The method according to claim 17, wherein the syntax comprises a specially-denoted comment.

21. The method according to claim 16, wherein the markup language is XML ("Extensible Markup Language").

22. The method according to claim 12, wherein the ability is signified using a cookie on the content request.

23. The method according to claim 11, wherein the augmented content response provides the second identifier using a header.

24. The method according to claim 23, wherein the header comprises an extended cache control header.

25. The method according to claim 23, wherein the header comprises a file identification header.

26. The method according to claim 25, wherein the file identification header is a Hypertext Transfer Protocol ("HTTP") header.

27. The method according to claim 11, wherein the augmented content response provides the second identifier using syntax of a markup language.

28. The method according to claim 27, wherein the markup language is Hypertext Markup Language ("HTML").

29. The method according to claim 28, wherein the syntax comprises a "META" tag using an "HTTP-EQUIV" attribute syntax.

30. The method according to claim 28, wherein the syntax comprises a "META" tag using a "NAME" attribute syntax.

31. The method according to claim 28, wherein the syntax comprises a specially-denoted comment.

32. The method according to claim 27, wherein the markup language is XML ("Extensible Markup Language").

33. The method according to claim 11, wherein the augmented content response provides the second identifier using a cookie on the content request.

34. The method according to claim 11, further comprising the step of caching the received content at the content caching system, responsive to the receiving step.

35. The method according to claim 34, further comprising the steps of:
receiving an update notification for a selected previously-cached content at the content caching system, wherein the update notification identifies the selected previously-cached content using a selected identifier thereof in the directory structure format;
consulting the mapping, using the selected identifier, to retrieve the first identifier in the uniform resource format; and
using the retrieved first identifier to request an update of the selected previously-cached content.

36. The method according to claim 35, wherein the using step further comprises steps of:
sending a new content request to the content server, wherein the new content request identifies the requested content using the retrieved first identifier;
receiving a new content response from the content server, wherein the new content response provides the requested updated content; and
caching the received updated content.

37. The method according to claim 34, further comprising the steps of:
receiving an invalidation notification for a selected previously-cached content at the content caching system, wherein the invalidation notification identifies the selected previously-cached content using a selected identifier in the directory structure format;
consulting the mapping, using the selected identifier, to retrieve the first identifier in the uniform resource locator format; and
using the retrieved first identifier to request an invalidation of the selected previously-cached content.

38. The method according to claim 11, wherein the second identifier is a file path and a file name.

39. The method according to claim 11, wherein the second identifier is a substituted file path and file name.

40. The method according to claim 39, wherein the substituted file path and file name is an encrypted file path and file name.

41. The method according to claim 11, further comprising steps of:
receiving, at the content server, the sent content request;
obtaining, by the content server, the requested content;
preparing a response message, by the content server, to transmit the obtained content, wherein the response message is augmented with the second identifier in the directory structure format; and
sending the prepared response message, including the obtained content, from the content server to the content caching system.

42. A system for addressing a name space mismatch between content servers and content caching systems, comprising:
means for automatically learning mappings between a directory structure format which identifies content elements accessible from one or more content servers and a uniform resource locator format which identifies content elements cached by a caching system, when the caching system receives the content elements from the content servers for caching, wherein the received content elements are identifiable to the caching system using the uniform resource locator format and also have associated therewith corresponding identifiers in the directory structure format, the mapping for each received content element storing its identifier in the uniform resource locator format and its corresponding identifier in the directory structure format;
means for receiving, at the caching system, a notification pertaining to one of the cached content elements, wherein the notification identifies the content element using its identifier in the directory structure format;
means for consulting the learned mappings using the identifier in the directory structure format from the notification, thereby determining the corresponding identifier in uniform resource locator format; and means for processing the received notification using the corresponding identification in the uniform resource locator format.

43. A system for addressing a name space mismatch between content caching systems end content servers, comprising:

means for sending a content request from a content caching system to a content server, wherein the content request identifies requested content using a first identifier in a uniform resource locator format;

means for receiving a content response at the content caching system from the content server, wherein the content response provides the requested content, identifiable using the first identifier, and is augmented with a second identifier of the requested content in a directory structure format; and means for creating an entry in a mapping, responsive to the means for receiving, wherein the entry maps the second identifier in the directory structure format to the first identifier in the uniform resource locator format.

44. A computer program product for addressing a name space mismatch between content sewers and content caching systems, the computer program product embodied on one & mare computer-usable media and comprising:

computer readable program code means for automatically learning mappings between a directory structure format which identifies content elements accessible from one or more content servers and a uniform resource locator format which identifies content elements cached by a caching system, when the caching system receives the content elements from the content servers for caching, wherein the received content elements are identifiable to the caching system using the uniform resource locator format and also have associated therewith corresponding identifiers in the directory structure format, the mapping for each received content element storing its identifier in the uniform resource locator format and its corresponding identifier in the directory structure format;

computer readable program code means for receiving, at the caching system, a notification pertaining to one of the cached content elements, wherein the notification identifies the content element using its identifier in the directory structure format;

computer readable program code means for consulting the learned mappings using the identifier in the directory structure format from the notification, thereby determining the corresponding identifier in the uniform resource locator format; and computer readable program code means for processing the received notification using the corresponding identification in the uniform resource locator format.

45. A computer program product for addressing a name space mismatch between content servers and content caching systems, the computer program product embodied on one or more computer-usable media and comprising, comprising:

computer readable program code means for sending a content request from a content caching system to a content sewer, wherein the content request identifies requested content using a first identifier in a uniform resource locator format;

computer readable program code means for receiving a content response at the content caching system from the content server, wherein the content response provides the requested content, identifiable using the first identifier, and is augmented with a second identifier of the requested content a directory structure format; and computer readable program code means for creating an entry in a mapping, responsive to the computer readable program code means for receiving, wherein the entry maps the second identifier in the directory structure format to the first identifier in the uniform resource locator format.

\* \* \* \* \*

UNITED STATES PATENT AND TRADEMARK OFFICE
CERTIFICATE OF CORRECTION

PATENT NO. : 6,985,936 B2
DATED : January 10, 2006
INVENTOR(S) : Rajesh S. Agarwalla et al.

It is certified that error appears in the above-identified patent and that said Letters Patent is hereby corrected as shown below:

Column 15,
Line 63, delete "in" between "space" and "mismatch".

Column 16,
Line 50, insert -- in the -- between "identifier" and "directory".

Column 18,
Line 2, insert -- locator -- after "resource".
Line 64, delete "clement" and replace with -- element --.

Column 19,
Line 2, insert -- the -- between "in" and "uniform".
Line 7, delete "end" and replace with -- and --.
Line 24, delete "sewers" and replace with -- servers --.
Line 25, delete "& mare" and replace with -- or more --.

Column 20,
Line 21, delete "sewers" and replace with -- servers --.

Signed and Sealed this

Eighteenth Day of April, 2006

JON W. DUDAS
*Director of the United States Patent and Trademark Office*